March 5, 1940.   N. P. BILLING   2,192,394
PHOTOGRAPHIC CAMERA
Filed Dec. 16, 1937   2 Sheets-Sheet 1
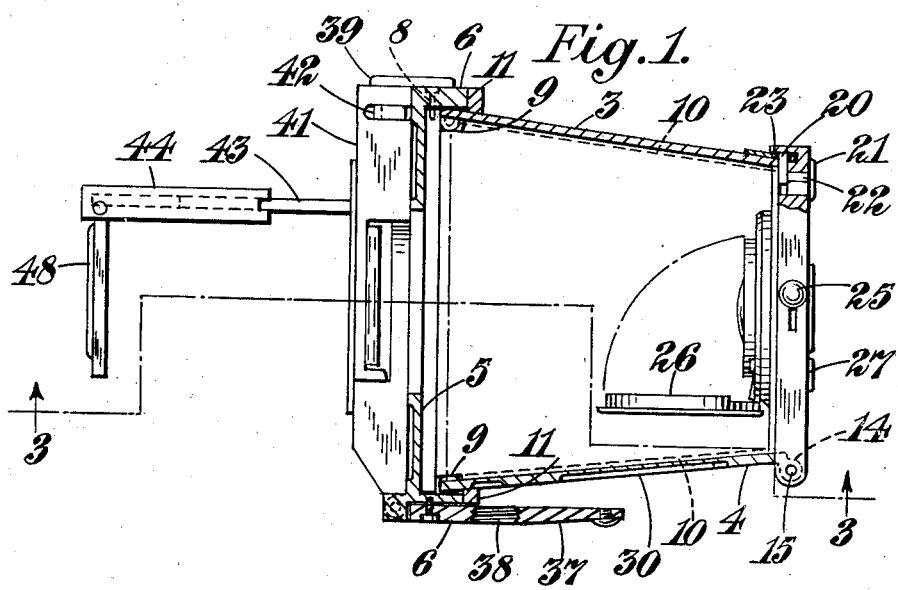
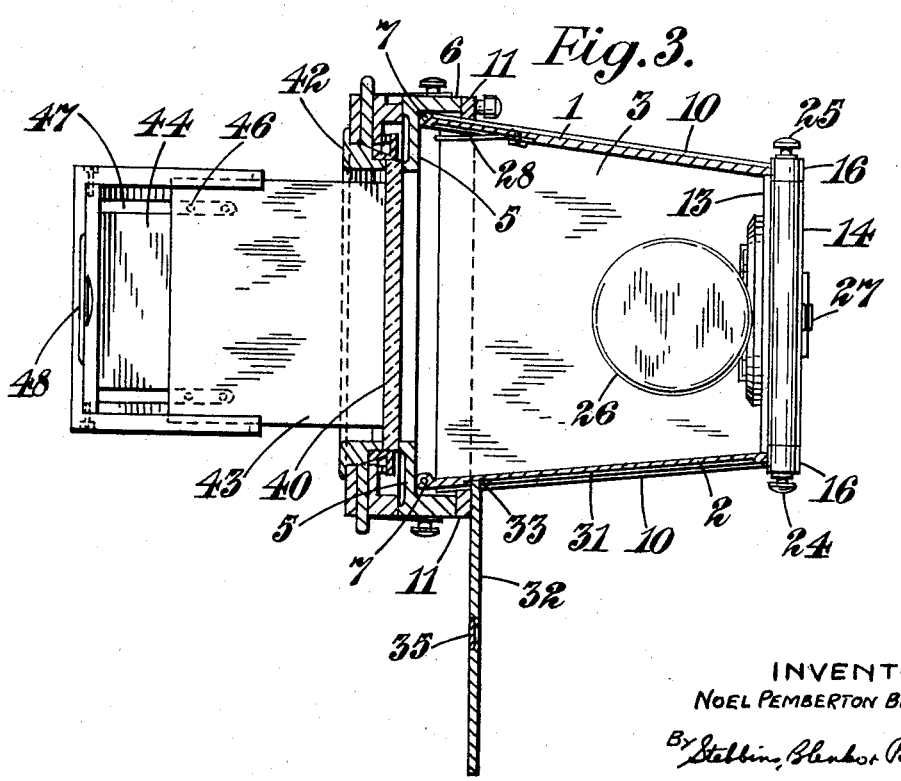
INVENTOR
NOEL PEMBERTON BILLING
ATTORNEYS March 5, 1940.   N. P. BILLING   2,192,394
PHOTOGRAPHIC CAMERA
Filed Dec. 16, 1937   2 Sheets-Sheet 2
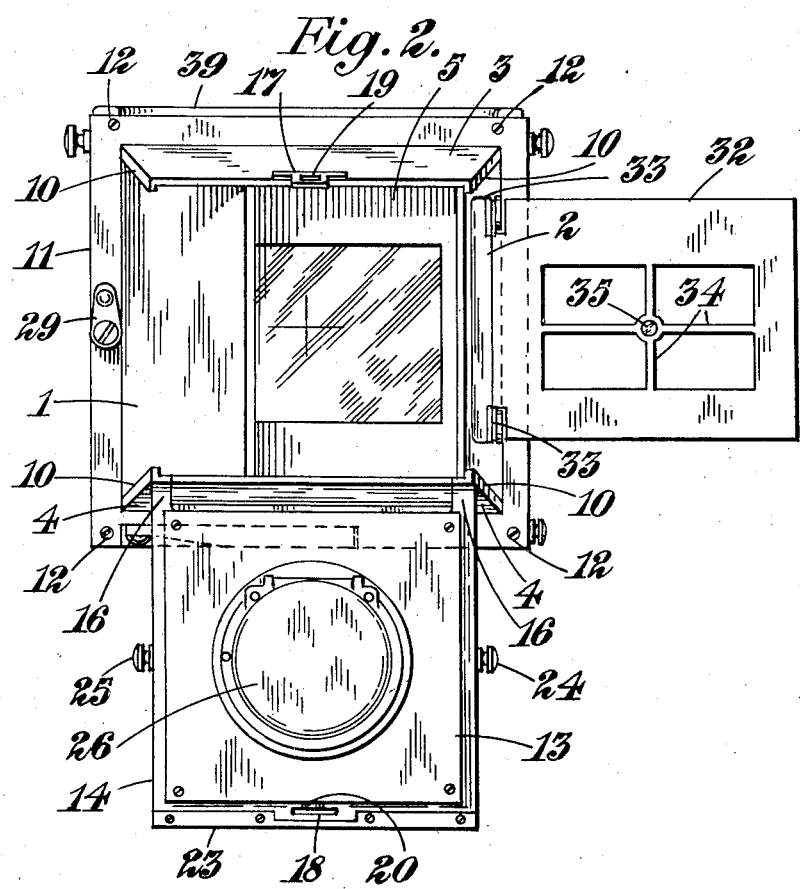
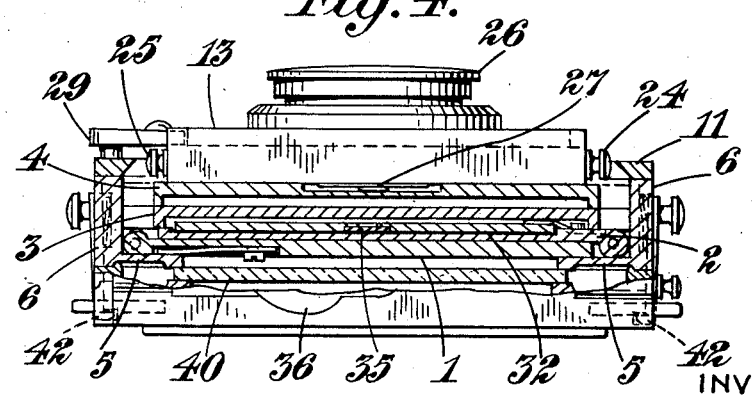
INVENTOR
NOEL PEMBERTON BILLING
ATTORNEYS Patented Mar. 5, 1940

2,192,394

UNITED STATES PATENT OFFICE 2,192,394

PHOTOGRAPHIC CAMERA

Noel Pemberton Billing, London, England

Application December 16, 1937, Serial No. 180,110
In Great Britain January 28, 1937

11 Claims. (Cl. 95—39)

The present invention comprises improvements in or relating to photographic cameras and it is an object of the invention to provide a camera body which can be collapsed to a position in which the various parts forming the body form a very small and compact assembly.

According to the invention a photographic camera body comprises a plurality of rigid elements which form the side walls of the camera and which are pivotally interconnected (either directly or through an intermediate member) to be capable of folding into positions adjacent and substantially parallel to one another, in combination with means rigidly to hold the said elements in their extended position in which they form the camera body.

Preferably at least one of the side wall elements is pivotally connected to a frame or base which forms part of the means to hold the elements in their extended position and which is preferably capable of folding to a position adjacent the folded wall elements. Conveniently the frame or base comprises a rearward frame in the camera body forming part of or securable to a holder for material having a light-sensitive surface. Conveniently also a front wall for the camera body is formed by a rigid element pivotally interconnected to one of the side wall elements and capable of folding into a position substantially parallel therewith, said front wall preferably serving also as part of the means for holding the side wall elements in their extended position.

In order that the invention may be more clearly understood a preferred constructional example thereof will be described with reference to the accompanying drawings in which—

Figure 1 is a side view partly in section of a collapsible box camera with the collapsible parts extended into positions such that the camera is ready for use;

Figure 2 is a front view of the camera shown in Figure 1 but having certain parts partially collapsed;

Figure 3 is an under plan view partly in section of the camera as shown in Figure 1 taken on the line 3—3 of that figure; and Figure 4 is a partial section of the camera, drawn to a larger scale, in its completely collapsed condition, the section being on a line which would extend centrally and horizontally of the camera parts as shown in Figure 2.

Like reference numerals indicate like parts in the various figures of the drawings.

The camera shown in the drawings has side wall elements 1, 2, 3 and 4 each comprising a substantially flat plate and constituting one complete wall of the camera body. The side wall elements 1, 2, 3 and 4 are pivotally connected to a frame or base 5 which is formed with an aperture through which light sensitive material is intended to be exposed to light rays passing through the lens of the camera. The base frame 5 is provided at its edges with flanges 6 between opposed pairs of which the side wall elements 1, 2, 3 and 4 are pivotally mounted. At their rearward ends which are connected to the base frame, the side wall elements are a close fit between opposed flanges 6 and have recesses or bores 7 in which to receive the ends of small screws such as 8 (Figure 1) passed through the flanges 6 and constituting a pivotal mounting for the side wall elements 1, 2, 3 and 4. The screws 8 are located at different distances in the flange 6 from the base 5 to enable the side wall elements 1, 2, 3 and 4 to be folded in turn against the plate 5 and against one another. The relation between the hinges for the side wall elements 1 and 2 will be seen most clearly from Figures 3 and 4 and the relation between the hinges for the side wall elements 3 and 4 will be seen from Figure 1. It is necessary for parts of the side wall elements 1 and 2 adjacent their pivotal mountings to be cut away around the pivotal mountings for the side wall elements 3 and 4 as seen at 9 in Figure 1. As will be appreciated from Figure 2 the side edges 3 and 4 are provided with flanges 10 to form light traps along adjacent side edges of the side wall elements when the latter are in position for use as shown in Figure 1, the side elements 1, 2, 3 and 4 being shaped and mounted so that they can be folded outwardly into positions in which their adjacent side edges substantially coincide. A light trap at the rear end of the side wall elements is conveniently also formed by means of a beading 11 secured by means of screws 12 to the front edge of the flanges 6.

It will be seen that the rear ends of the side wall elements 1, 2, 3 and 4 are held in position by means of their pivotal mounting, and the camera front 13 serves rigidly to hold and lock the front edges of the side wall elements 1, 2, 3 and 4 in their extended position. The camera front 13 comprises a substantially flat rectangular plate having a recess 14 at its edges in which to receive the end edges of the side wall elements 1, 2, 3 and 4. The camera front 13 is hinged to the side wall element 4 at the front edge of the latter by means of hinges which permit the front 13 to hinge from the position in which the camera body is assembled (as shown in Figure 1) downwardly through the position shown in Figure 2 to a position in which the camera front 13 is adjacent and substantially parallel to the external surface of the side wall element 4. The lower side of the front edge of the side plate 4 is formed with a hollow cylindrical portion 14 through which a hinge pin 15 can pass, the hinge pin also passing through depending side portions 16 of the camera front 13, said side portions 16 being located at opposite ends of the cylinder 14. With this construction it is still possible when the camera is extended for use for the front end edge of the side plate 4 to engage with part of the recess 14 provided at the edges of the inner side of the camera front 13.

The side wall element 3 is also provided at its forward edge with a projection 17 arranged to pass through a slot 18 in the camera front 13 when the latter is folded up to engage the front edges of the extended side wall elements. The projection 17 is itself provided with a slot 19 into which a locking pin 20 can be inserted to secure the side wall elements and camera front in their extended positions. The locking pin 20 is operated by means of a button 21 located on the outer surface of the camera front and covering the slot in which slides the connecting part 22 extending between the button 21 and the locking pin 20. A guarding flange 23 is secured along the edge of the camera front 13 in order completely to enclose the locking device formed by the projection 17 and the locking pin 20. The camera front 13 is conveniently formed as a pair of plates between which are carried the camera lens or lenses and a shutter mechanism which can be operated in a well-known manner by the knob 25 for instantaneous exposures, knob 24 being operated when time exposures are to be made. Interchangeable stops are also located between the plates of the camera front 13 and are interchanged by actuation of the button 27 located on the outer surface of the camera front. Other devices such as colour filters may be provided between the plates forming the camera front if desired. All parts mounted in the camera front may be of any desired or well known form of construction. Preferably however on the inner side of the camera front 13 there is provided a hinged lens cover 26 which is moved to the positions shown in Figures 1 and 3 when the camera is to be used.

When the camera is to be collapsed the button 21 is moved to withdraw the locking pin 20 from the slot 19 of the projection 17 and the camera front 13 hinged downwardly to the position shown in Figure 2. The side wall element 1 is then folded inwardly into contact with and substantially parallel to the base 5 and the remaining side wall elements 2, 3 and 4 are then folded in turn on top of the side wall element 1. The camera front 13 is then folded back into contact with the external surface of the side wall element 4 to bring the various parts to the position shown in Figure 4, the lens cover 26 being closed. It will be noted that all parts of the camera then form different layers of a compact and thin rectangular assembly so that the invention is thus capable of being employed to produce a very small box camera. A small leaf spring 28 (Figure 3) is conveniently secured to the inside of the side wall element 1 to contact with the base 5 in closed position and facilitate opening of the camera into position for use. A short crank arm 29 is also mounted on the beading 11 at one side thereof for movement to the position shown in Figure 4 at which it engages an edge portion of the front 13 when the camera is in the folded condition in order to secure the various parts of the camera in this position.

In the construction which has been described the outer surface of the side wall element 4 is conveniently recessed at 30 to receive the projecting button 27 on the outer surface of the camera front 13. Similarly the side wall element 2 is recessed at 31 to receive a view finder 32 secured to the side wall element 2 by means of hinges 33. The view finder 32 has cross wires 34 and a central transparent bead 35 and is folded into the recess 31 when the camera is collapsed. With the type of view finder which has been described a back sight is not necessary provided the camera is held close to the eye.

The base frame 5 conveniently has a recess 36 at its lower edge into which may be turned the camera support 37 seen in Figure 1 and pivotally secured at one end to the base frame 5. The support 37 is provided with a screw-threaded aperture 38 to receive a tripod head. The screws in the flanges 6 forming the pivots for the side wall elements are preferably received in recesses in the flanges 6 or else covered by suitable overlying plates or beads such as the U-shaped bead 39 provided at the top of the camera and shown in Figures 1 and 2.

The camera back is conveniently of a form similar to that described in United States Patent No. 2,093,399 in which a glass viewing screen such as 40 constitutes a pressure plate for application to the rear of the cut film or glass plates carried in a suitable envelope inserted between the camera back and the base frame 5. The main frame 41 of the camera back is hinged at its lower end to the base frame 5 and catches 42 are provided to secure these parts together at the upper end and to release the camera back so that an envelope containing light sensitive material may be inserted between the camera back and the base frame 5. The main frame 41 of the camera back carries a subsidiary frame 42 held by spring pressure in a forward position relatively to the frame 41 and carrying also a flap 43 pivotally mounted to cover or expose the translucent glass screen 40. The flap 43 conveniently carries a slide 44 guided by pins 46 extending into slots 47 in the slide 44, which slide also carries a lens 48 through which an image on the translucent glass screen 40 may be viewed. The mount for the lens 48 is pivotally secured to the slide 44 so that it may be folded into contact with the end surface of the flap 43, the slide then pushed home and the flap 43 folded downwardly to cover the glass screen 40, the parts 43, 44 and 48 being received in a central recess or aperture in the subsidiary frame 42.

I claim:
1. A photographic camera body comprising a base to form at least part of the back section of the camera body, a front end wall for the camera of such dimensions that it will nest within the base, four forwardly tapering side walls, the rear edges of which are pivoted to the inside of the back section, the pivots of each side wall being offset in different planes whereby the sides may successively fold one upon another in a substantially parallel relationship the side walls each being integrally formed as a rigid substantially flat plate to constitute one complete wall of the camera body, the front end wall being pivoted to the forward edge of one side wall so as to fold outwardly upon that side wall, the pivots of which are farthest away from the base and means for rigidly holding the side walls and said end parts in their extended position in which they form the camera body.

2. A photographic camera body according to claim 1 wherein the base forms part of the means to hold the walls of the camera body in their extended position and constitutes part of or is securable to a holder for material having a light-sensitive surface.

3. A photographic camera body according to claim 1 in which the front end wall is formed as a rigid substantially flat plate and constitutes also part of the means for holding the side walls in their extended position.

4. A photographic camera body according to claim 1 in which the walls are formed to interfit at their edges when in an extended position to form light-proof seals along the said edges.

5. A photographic camera body according to claim 1 comprising a rectangular base or frame, four side walls pivotally mounted inside the base and offset in different planes so that they may successively fold one upon another, a flange at the edges of the base to overlie the inner ends of the side walls when in their extended position and a front wall pivotally carried at the outer end of that side wall intended to be folded last on to the other side walls with grooves on the inner face of the front wall at the edges thereof to receive the outer ends of the side walls.

6. A photographic camera body according to claim 1 comprising a rectangular base or frame, four forwardly tapered side walls pivotally mounted in different planes at the insides of the base so as to be foldable one on to the other, a flange at the edges of the base to overlie the inner ends of the side walls when in their extended position, a front wall pivotally carried at the outer end of that side wall farthest removed from the base and intended to be folded last on to the other side walls with grooves on the inner face of the front wall at the edges thereof to receive the outer ends of the side walls and interengaging locking elements to secure the camera body in its extended position carried by the front wall and that side wall opposite that to which the front wall is pivotally secured.

7. A photographic camera body according to claim 1 comprising a rectangular base or frame, four forwardly tapered side walls pivotally mounted at the sides of the base in different planes to be foldable one on to the other, a flange at the edges of the base to overlie the inner ends of the side walls when in their extended position, a front wall pivotally carried at the outer end of that side wall intended to be folded last on to the other side walls with grooves on the inner face of the front wall at the edges thereof to receive the outer ends of the side walls and a leaf spring on the inner surface of that side wall pivoted closest to the base and intended to be folded first against the base frame, which spring facilitates extension of the walls of the camera body into position for use.

8. A photographic camera body according to claim 1 comprising a rectangular base or frame, four forwardly projecting side walls pivotally mounted at the sides of the base in different planes so as to be foldable one on to the other, a flange at the edges of the base to overlie the inner ends of the side walls when in their extended position, a front wall pivotally carried at the outer end of that side wall pivoted farthest from the base and intended to be folded last on to the other side walls with grooves on the inner face of the front wall at the edges thereof to receive the outer ends of the side walls and a catch carried by the base frame to engage the folded front and side walls and secure them in their folded position.

9. A photographic camera body according to claim 1 comprising a rectangular base or frame, four forwardly projecting side walls pivotally mounted at the insides of the base in different planes so as to be foldable one on to the other, a flange at the edges of the base to overlie the inner ends of the side walls when in their extended position, a front wall pivotally carried at the outer end of that side wall pivoted farthest from the base and intended to be folded last on to the other side walls with grooves on the inner face of the front wall at the edges thereof to receive the outer ends of the side walls and a lens carried by the front wall and a cap hingedly connected to the inner surface of the wall to protect the lens when the wall is folded outwardly against that side wall to which it is pivotally connected when the camera is in its collapsed condition.

10. A photographic camera body according to claim 1 comprising a rectangular base or frame, four side walls pivotally mounted in different planes at the insides of the base to be foldable one on to the other, a flange at the edges of the base to overlie the inner ends of the side walls when in their extended position, a front wall pivotally carried at the outer end of that side wall pivoted farthest from the base and intended to be folded last on to the other side walls with grooves on the inner face of the front wall at the edges thereof to receive the outer ends of the side walls, a direct-vision view finder frame hinged to one side wall so as to project beyond the side wall into view-finding position and a recess in said last mentioned side wall in which the view-finder frame may be received when folded.

11. A photographic camera body according to claim 1 comprising a rectangular base or frame, four side walls pivotally mounted in different planes at the insides of the base to be foldable one on to the other, a flange at the edges of the base to overlie the inner ends of the side walls when in their extended position, a front wall pivotally carried at the outer end of that side wall intended to be folded last on to the other side walls with grooves on the inner face of the front wall at the edges thereof to receive the outer ends of the side walls and a direct-vision view finder frame hinged to one side wall close to the rear of the camera body and comprising cross-wires carrying a central transparent element, said finder frame being movable into a position beyond the side wall and substantially parallel to the base.

NOEL PEMBERTON BILLING.